(12) United States Patent
Bancila et al.

(10) Patent No.: US 8,724,473 B2
(45) Date of Patent: May 13, 2014

(54) LOCATING SIGNATURES IN PACKETS

(75) Inventors: Vlad Bancila, Bucharest (RO); Adrian Stanciu, Bucharest (RO)

(73) Assignee: Ixia, Calabasas, CA (US)

( * ) Notice: Subject to any disclaimer, the term of this patent is extended or adjusted under 35 U.S.C. 154(b) by 282 days.

(21) Appl. No.: 12/838,360

(22) Filed: Jul. 16, 2010

(65) Prior Publication Data

US 2012/0014256 A1    Jan. 19, 2012

(51) Int. Cl.
*H04L 12/26*    (2006.01)

(52) U.S. Cl.
USPC ............................................. 370/241

(58) Field of Classification Search
CPC . H04L 12/2697; H04L 43/50; H04L 43/0829; H04L 43/087; H04L 43/0888; H04L 43/0852
USPC ......... 370/241, 250, 419, 316, 411, 252–254, 370/412–416; 709/224, 227, 212–216; 726/22, 23, 24, 25; 708/212
See application file for complete search history.

(56) References Cited

U.S. PATENT DOCUMENTS

| | | | |
|---|---|---|---|
| 5,333,135 A | 7/1994 | Wendorf | |
| 5,680,585 A | 10/1997 | Bruell | |
| 6,252,891 B1 | 6/2001 | Perches | |
| 6,389,532 B1 | 5/2002 | Gupta et al. | |
| 6,954,789 B2 | 10/2005 | Dietz et al. | |
| 7,099,438 B2 | 8/2006 | Rancu et al. | |
| 7,613,755 B1 * | 11/2009 | Venkatachary | 708/212 |
| 7,840,664 B2 | 11/2010 | Dugatkin et al. | |
| 2002/0167912 A1 | 11/2002 | Melville et al. | |
| 2004/0042415 A1 | 3/2004 | Melville et al. | |
| 2004/0236866 A1 | 11/2004 | Dugatkin et al. | |
| 2005/0204170 A1 | 9/2005 | Belenky et al. | |
| 2006/0106583 A1 | 5/2006 | Fdida et al. | |
| 2007/0064598 A1 | 3/2007 | Nooner et al. | |
| 2008/0140662 A1 | 6/2008 | Pandya | |
| 2008/0259806 A1 | 10/2008 | Jorgenson | |
| 2009/0010170 A1 * | 1/2009 | Pepper et al. | 370/241 |
| 2009/0310491 A1 | 12/2009 | Ginsberg et al. | |
| 2011/0022601 A1 * | 1/2011 | Elrom et al. | 707/747 |

OTHER PUBLICATIONS

Ixia Communications, IxExplorer User's Guide, Revision 2.1.0, Nov. 1, 1999, pp. 1-384.
Ixia Communications, The Ixia 200 Traffic Generator and Analyzer, Product Description, 199701999, last accessed on Aug. 15, 2003, file://C:/DS/IXIA/Patents/081403/ix200.htm, pp. 1-2.

(Continued)

*Primary Examiner* — Jae Y Lee
*Assistant Examiner* — Jean F Voltaire
(74) *Attorney, Agent, or Firm* — SoCal IP Law Group LLP; Mark A. Goldstein

(57) ABSTRACT

A system and method for locating signatures in packets is disclosed. The method may include receiving a packet over the network and searching the packet for a signature at locations specified in a location cache. When the signature is found at a stored location specified in the location cache, pertinent data located after the signature is obtained and network testing processing is performed. When the signature is not found at any stored location specified in the location cache, the packet is searched for the signature. When the signature is found, the location at which the signature is found is added to the location cache. Pertinent data located after the signature is obtained and network testing processing is performed. The method may be performed by a network testing system and by a computing device having a virtual machine.

18 Claims, 4 Drawing Sheets

(56) References Cited

OTHER PUBLICATIONS

Ixia Communications, Ixia 200 Chassis, Product Description p. 1.
Kegel, The C10K Problem, http://kegek,com/c10k.htmlProblem, Accessed Nov. 2, 2003.
Boyer et al., A Fast String Searching Algorithm, Communications of the ACM, vol. 20, No. 10, Oct. 1977, pp. 1-11.
Kesong et al., Research on a Faster Algorithm for Pattern Matching, Shanghai Jiaotong University, Department of Computer Science, pp. 119-124.
Sunday, A Very Fast Substring Search Algorithm, Communications of the ACM, vol. 33, No. 8, Aug. 1990, pp. 132-142.
VMware, Inc., VMware ESX and VMware ESXi The Marketing Leading Production-Proven Hypervisors, Product Datasheet, pp. 1-6.

* cited by examiner

LOCATING SIGNATURES IN PACKETS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications testing and checking for conflicts in user specified network tests.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may also be used to evaluate how well a network device or network segment handles data communication, streaming media and voice communications.

DETAILED DESCRIPTION

Apparatus

Figure 1:
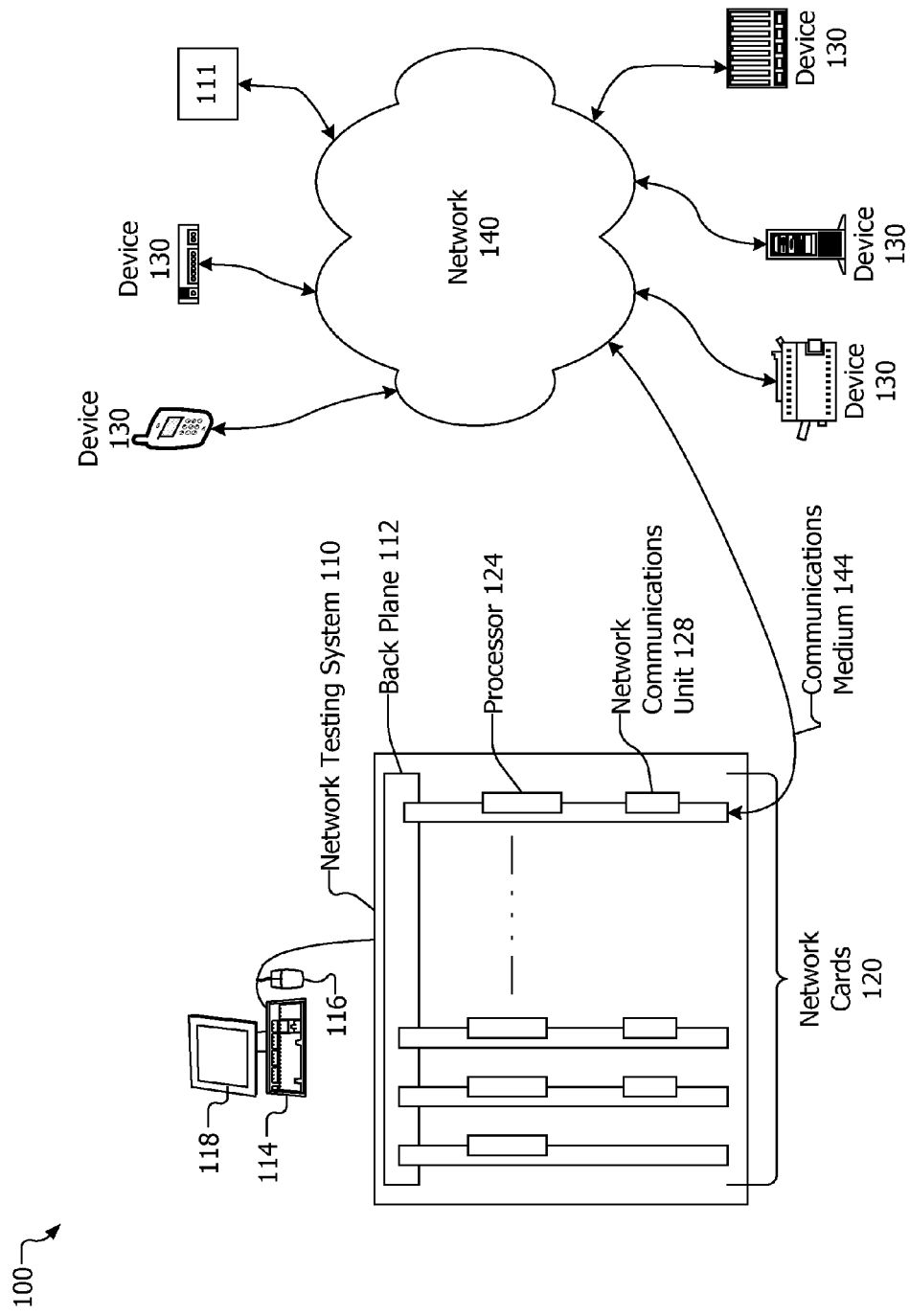
FIG. 1 is a block diagram of a first environment in which locating signatures in packets may be implemented.

FIG. 1 is a block diagram of a first environment 100 in which locating signatures in packets may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 144. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communication medium, a network application, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although a single connection over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS- IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as I.link® and Firewire®); may support proprietary protocols; and may support other protocols. Each network card 120 may support a single communications protocol, may support a number of related protocols, or may support a number or combination of related or unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard of the network testing system 110, on another card, on the backplane or by a remote or external unit. When the network card 120 includes two or more network communications units 128, the network card 120 is in effect two or more network devices. That is, a network card 120 having n network communications units 128 may function as n network devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor 124 may be stored on and executed from a local or remote machine readable medium or storage device. A machine readable medium includes, for example, without limitation, magnetic media (e.g., hard disks, tape, floppy disks), optical media (e.g., CD, DVD, BLU-RAY DISC®), flash memory products (e.g., MEMORY STICK®, COMPACTFLASH® and other flash memory media), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, magnetic tape, solid-state drives (SSDs), DVD drives, BLU-RAY DISC® drives, flash memory devices, and others.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network devices 130 in the network 140. The network testing system 110 may be used to test and evaluate the network 140 and/or portions thereof, network devices 130, applications running on network devices 130, and/or services provided by network 140 and/or network devices 130 and/or network applications. The network testing system 110, the network cards 120, and the network communications units 128 may all be network devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for packets to travel. Each node may be a network device as described herein. A node may be a computing device, a data communications device, a network device, a network card, or other devices as defined and described herein.

Communications on the network 140 may take various forms, including frames, cells, datagrams, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others.

The network devices 130 may be devices capable of communicating over the network 140 and/or listening to, injecting, delaying, dropping, relaying, processing, and/or modifying network traffic on network 140. The network devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network devices 130 may be devices to be tested and may be referred to as devices or systems under test.

The network testing system 110 may send communications over the network 140 to a or through a network device 130. The destination of communications sent by the network testing system 110 may be a device under test such as a network device 130, may be the network testing system 110 such as a test between two network cards in the same network testing system 110, and may be a second network testing system 111. The network testing system 111 may be similar to or the same as network testing system 110. A first network card 120 in the network testing system 110 may send communications over the network 140 to a or through a network device 130 that are received by a second network card 120 in the network testing system 110 or are received by a third network card in the network testing system 111. A first network communications unit in a first network card in the first network testing system 110 may send communications over the network 140 to a second network testing system 111, and a second network communications unit the first network card in the first network testing system 110 may receive communications over the network 140 from the second network testing system 111. A first network communications unit in a first network card in the network testing system 110 may send communications over the network 140 and optionally through a network device 130 to a second network communications unit on the same network card in the same network testing system. The network testing system 110 may listen to and capture communications on the network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a network testing system. The network testing software may be stored on a volatile or nonvolatile memory device or storage medium included in or on and/or coupled with a computing device, a network testing system, a network card, or other card. The methods may be implemented on one or more network cards 120 in a single network testing system or may be implemented on one or more network cards 120 on each of two or more network testing systems.

Network tests run on network testing system 110 may test the functionality and features of network devices 130 coupled with network 140 and of applications or other software running on servers or network devices 130 coupled with network 140. In one embodiment, when testing the functionality and features of devices coupled with network 140, a first network card 120 in network testing system 110 would perform the actions recited in block 310 of FIG. 3 described below, packets would be transmitted to a network device 130 (commonly referred to as a device under test or DUT) coupled with the network 140 and directed to, for example, a second network card 120 which would perform the actions in blocks 320 through the end of the method shown in FIG. 3 described below. In an another embodiment in which two network testing systems are used, a first network card 120 in network testing system 110 would perform the actions recited in block 310 of FIG. 3 described below, packets would be transmitted to a network device 130 (or DUT) coupled with the network 140 and directed to, for example, a network card 120 included in a second network testing system 111 which would perform the actions in blocks 320 through the end of the method shown in FIG. 3 described below.

Figure 2:
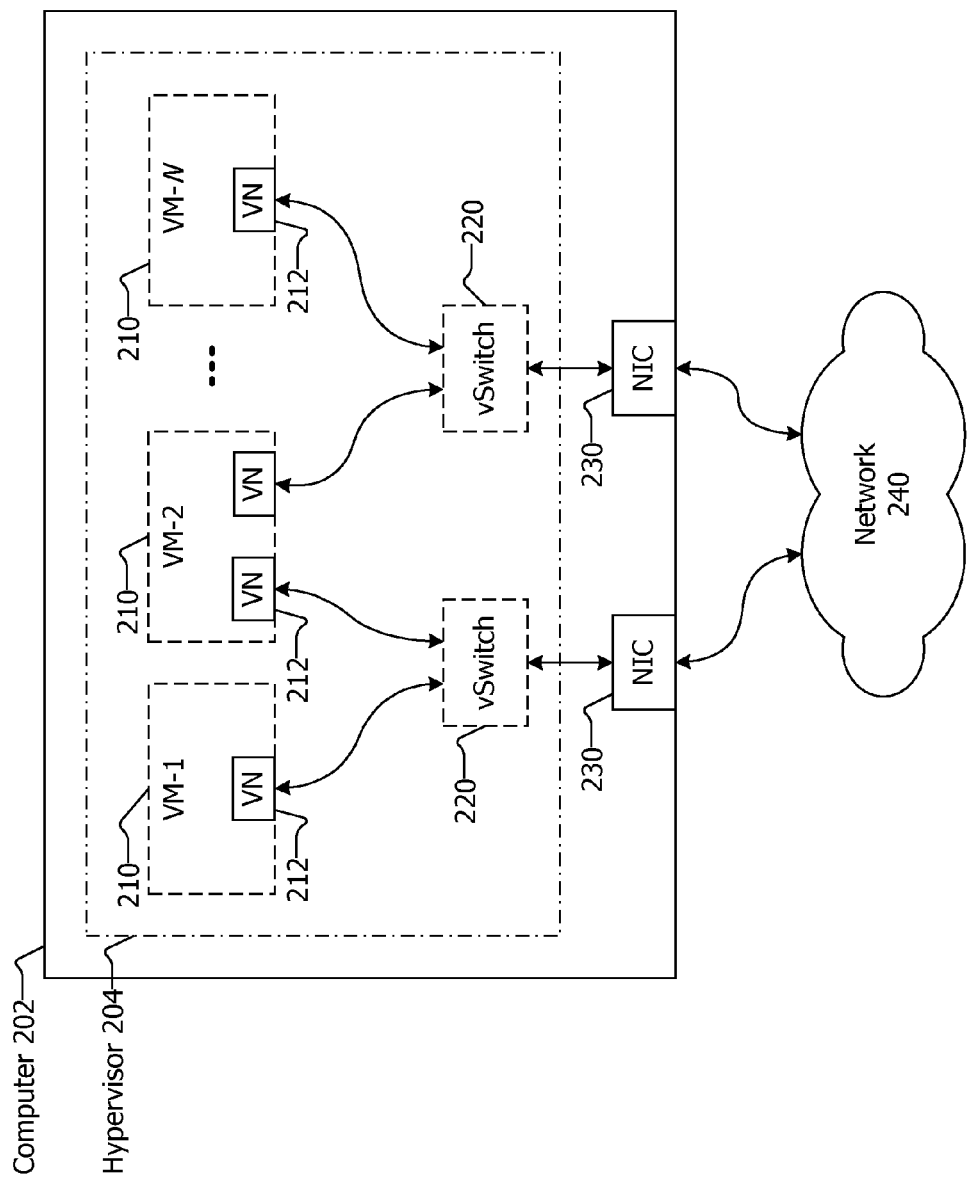
FIG. 2 is a block diagram of a second environment in which locating signatures in packets may be implemented.

The testing environment shown in FIG. 1 may be virtualized such that some of the hardware components are implemented virtually as software. FIG. 2 is a block diagram of a second environment in which locating signatures in packets may be implemented. In this environment, the network testing system may be a computer 202 running an software that supports virtualization. The virtualization software or virtual machine software such as hypervisor 204 may run concurrently with an existing operating system on computer 202 or may run independently such that no operating system is provided on computer 202. In one embodiment, the virtualization software may be the ESX product available from VMware, Inc. of Palo Alto, Calif. that provides a hypervisor or virtual machine monitor. In the hypervisor 204 or other software that supports virtualization, one or more virtual machines 210 may be established to run multiple instances of network testing software. In one embodiment, each of the virtual machines 210 is a virtualization of a network card 120 described above regarding FIG. 1 and shares the features and characteristics of the network cards 120. Each of the virtual machines has one or more virtual network communications units (VN) 212. The virtual network communications units VN 212 are virtualizations of network communications units 128 and share the features and characteristics of the network communications units 128. In another embodiment, each of the virtual machines 210 is a virtualization of a network testing system 110 described above regarding FIG. 1.

The computer 202 includes at least one network communications unit (NCU) 230 to communicate over a network 240. The NCU 230 is the same or similar to the NCU 128 and the network 240 is the same or similar to the network 140, both described above regarding FIG. 1. Various devices (not shown) may be coupled with network 240 just as devices 130 are coupled with network 140.

Network tests run on computer 202 may test the functionality and features of network devices coupled with network 240, of applications or other software running on servers or network devices coupled with network 240, or of one or more virtual switches (vSwitch) 220.

When testing the functionality and features of devices coupled with network 240, the first virtual machine VM-1 would perform the actions recited in block 310 of FIG. 3 described below, packets would be transmitted to a network device (commonly referred to as a device under test or DUT) coupled with the network 240 and directed to, for example, the second virtual machine VM-2 which would perform the actions in blocks 320 through the end of the method shown in FIG. 3 described below. In an another embodiment in which two computers 202 are used, a virtual machine on a first computer would perform the actions recited in block 310 of FIG. 1004-3 described below, packets would be transmitted to a network device (or DUT) coupled with the network 240 and directed to, a virtual machine on a second computer which would perform the actions in blocks 320 through the end of the method shown in FIG. 3 described below.

Network tests may be run internally on the computer 202 such that the system and methods described herein allow for the testing of software that will later be included in hardware switch devices. In this configuration, the vSwitch software 220 executing on computer 220 may be software to be tested before installation in a hardware switch device, router, hub or other network device. In this configuration, packets generated by a first virtual machine VM-1 210 may be transmitted to a vSwitch 220 which directs the packets to a second virtual machine VM-2 210. In this configuration, the first virtual machine VM-1 would perform the actions recited in block 310 of FIG. 3 described below, and the second virtual machine VM-2 would perform the actions in blocks 320 through the end of the method shown in FIG. 3 described below.

In either environment shown and described above in FIGS. 1 and 2, the network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

Methods

Figure 3:
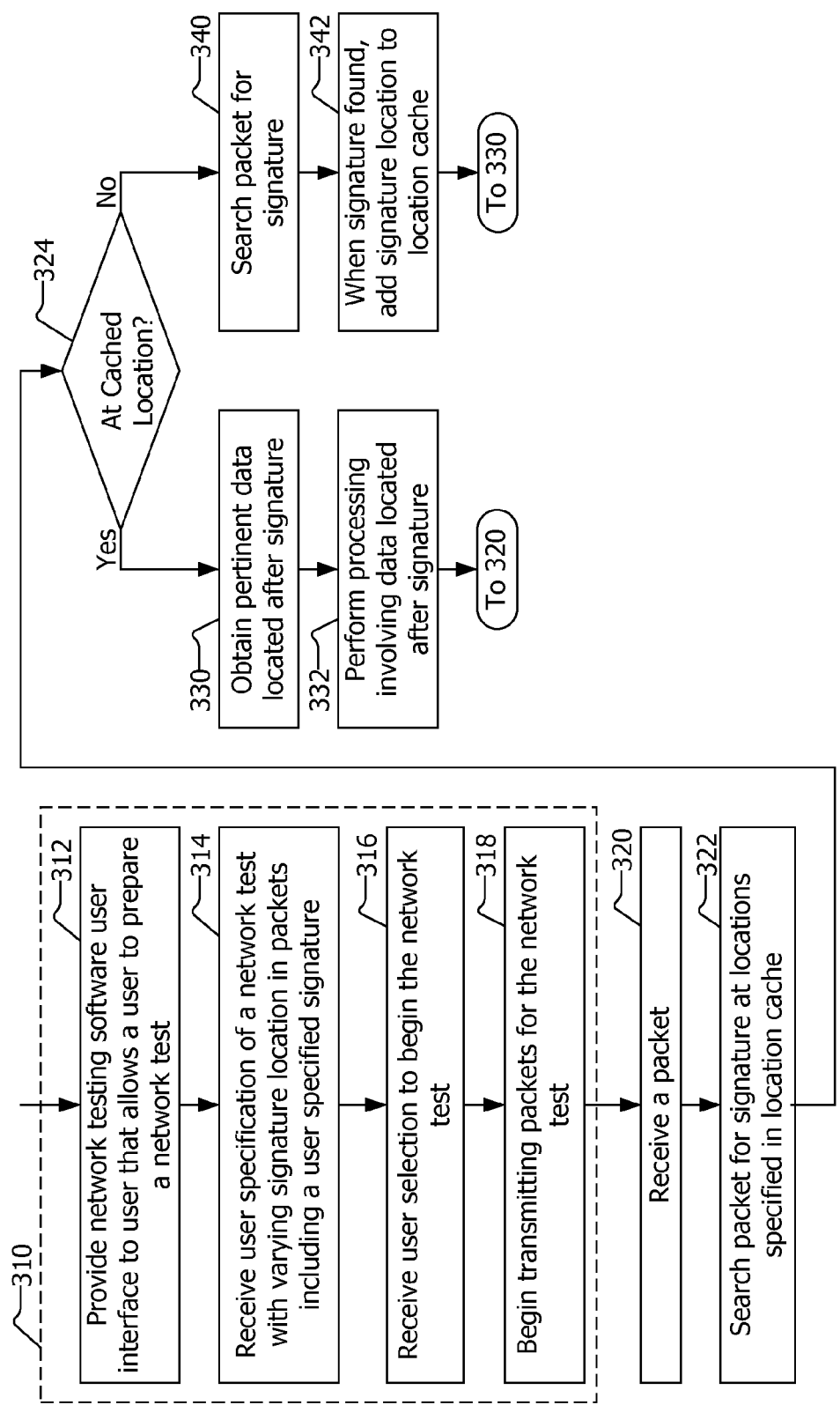
FIG. 3 is a flow chart of actions taken to implement a method of locating signatures in packets.

FIG. 3 is a flow chart of actions taken to implement a method of locating signatures in packets. Steps taken to obtain user specification and execution of network tests with varying signature location in packets are shown in block 310. The network testing software provides a network testing software user interface that allows a user to prepare a network test, as shown in block 312. The network testing software receives a user specification of a network test designating that the signature location in packets should vary (that is, the network test designates a varying signature location) and including a user specified signature, as shown in block 314. That is, in specifying the network test, the user specifies a signature to be included in packets and that the location of the signature within a packet will not be in a set location, but the location will change or vary from packet to packet or between groups of packets.

The signature may be used as a filtering mechanism for a receive port in the network testing system and/or on a network card. The receive port may filter out those packets that do not have a particular signature. In this way, the receive port may focus on packets that include the desired signature. For example, a receive port may receive a large number of packets from a switch, but a user of the system, typically a tester, may only want to analyze packets coming from a particular source designated by a particular signature included in the packets. To achieve this, the transmitting port in a network testing system or network card places a signature in the packets that will be analyzed on the receive side by a receiving network testing system. In this way, the network testing software receiving packets from a receive port will only analyze packets with the particular signature and will ignore other packets.

The network testing software provides a user interface that allows the user to specify these features of a network test. The network testing software user interface may include text or data entry boxes, pull down menus, check boxes, radio buttons, and/or other user interface constructs or techniques.

Figure 4:
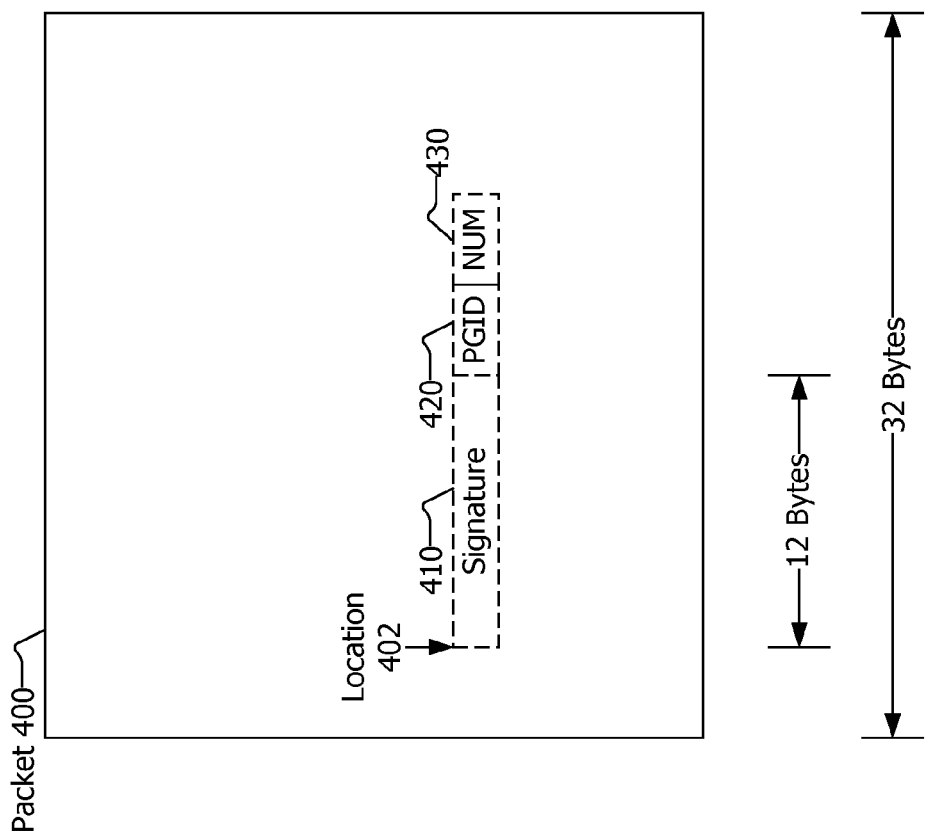
FIG. 4 is a block diagram of a packet with a signature included therein.

FIG. 4 is a screen shot of a packet 400 with a signature 410 included therein. The signature may be a size used by the network testing system, and may be 32 bits, 64 bits, 128 bits, 20 bytes, 24 bytes, 32 bytes, etc. In the embodiment shown in FIG. 4, signature 410 is 12 bytes. The signature 410 may be placed in the packet toward the beginning or head of the packet 400, toward the end or tail of the packet, or somewhere in between, as shown. The signature location 402 may be considered as an offset from the start or head of a packet. The signature location may be specified as a number of bits, bytes or words from the start or head of a packet.

Returning to a discussion of FIG. 3, the network testing software receives a user selection to begin the user specified network test with varying signature location in packets, as shown in block 316. The network testing software begins transmitting packets for the network test over the network, as shown in block 318.

Depending on the user specified network test and the configuration of the hardware devices in the specific test environment, the same network testing system that transmits packets may receive, process and analyze the packets sent in the network test. In some configurations, a second network testing system may receive the packets that initiated from a network test on a first network testing system. As such, the actions taken in blocks 320 through 344 may be performed by the same or different network testing system, or the same or different virtual machine, as performed the actions in block 310.

Returning to a discussion of FIG. 3, the network testing software receives a packet, as shown in block 320. The network testing software searches the packet for a signature at each stored location specified in a location cache, as shown in block 322. As a preliminary step, the network testing software may create an empty location cache in memory before block 320. The location cache is stored in volatile memory included in a network card, on a mother board or other RAM accessible to network testing software executing on a network testing system or computer. The location cache may be stored as a file for later use with other network tests. The number of locations included in the location cache may be set to increase the efficiency and performance of the methods and system. The number of locations included in the location cache may be 1, 2, 4, 6, 9, 12, 18, 24, 32, 48, etc. In one embodiment, the location cache holds four locations. The location may be specified as an offset from the beginning of a packet in bits, bytes, or words. If the current packet is the first packet to be received, the location cache will be empty, and the search in block 322 is skipped. In all other circumstances, the network testing software searches for the user specified signature at each of the locations specified in the location cache. Identifying a signature is achieved by a simple alphanumeric match.

In one embodiment, the first location searched in a current packet is the location at which a signature was found in a prior packet as specified by an entry in the location cache. In this embodiment, the location of the last signature found is the first location searched in the current packet. That is, the location of the last signature found is placed in the first position in the location cache or otherwise designated as the first location to be searched.

When the signature is found at a location specified in the location cache, as shown in block 324, the network testing software obtains pertinent data included after the signature, as shown in block 330. In one embodiment, as shown in packet 400 in FIG. 4, a program group identifier (PGID) 420 and other pertinent data such as a sequence number (NUM) 430 are included in the packet immediately after the signature. The network testing software may perform processing involving the data located after the signature, as shown in block 332. This processing may include packet latency computation, packet roundtrip transmission time computation, packet sequence checking, counting packets, filtering packets, jitter analysis, inter-arrival-gap analysis, and others. The flow of actions then continues at block 320 where a next packet is received. The method may end when no further packets are received, when a user or system specified timeout is reached, or at the occurrence of another user or system specified event.

If after the network testing software searches for a signature as each of the locations specified in the location cache a signature is not found at a cached location, as shown in block 324, the network testing software searches the entire packet for a signature, as shown in block 340. The search may be performed according to various algorithms or techniques. One such technique is the Boyer-Moore fast string searching algorithm. Another is the Knuth-Pratt-Morris algorithm.

In some embodiments, a simpler version of the Boyer-Moore algorithm known as a Quick Search Algorithm performs better for small signatures and large alphabets. In general a quick search algorithm consists of three steps. First, attempt to match a signature at a current location in the packet. Second, if the signature at the current location does not match, set the current location to an increment further into the packet. Third, go to the first step. The increment used differs in different embodiments. In one embodiment, the increment may be a byte or word further along in the packet. In another embodiment, the increment may be may be a size of the signature, such as, for example 12 bytes. In this example, the algorithm may search for signatures at multiples of 12 byte offsets from the beginning of the packet, such as, 12, 24, 36, 48, etc. until the signature is located or the end of the packet is reached. In another embodiment, the increment may be may be a size or distance further in the packet based on the location of an earlier found signature. For example, if in a prior packet, a signature was found 62 bytes in, the algorithm may search for signatures at multiples of 62 byte offsets from the beginning of the packets, such as, 62, 124, 186, 248, etc. until the signature is located or the end of the packet is reached. In some embodiments it may be known that a signature may be on certain boundaries in the packet. In these embodiments, the algorithm uses that known boundary value as the increment. In another embodiment, the increment changes each time it is determined that a match is not found. In this embodiment, the number of bits from start of the current search to a non-matching location plus the total size of the signature in bits is used as the increment.

In addition, to make searching more efficient, a bit mask may be used so that only certain designated significant bits may be searched. In this way, the entire 12 bytes of the signature or other size signature need not be evaluated. As less data will be searched, the speed of the search is increased. Here is an example portion of mask in which 0 means do not use the bit from the signature in matching while a 1 in the mask means that the bit from signature is used in matching, 32 bits are shown:

| MASK: | 11001001 | 00111100 | 11111111 | 11111111 |
|---|---|---|---|---|
| BIT | 01234567 | 89012345 | 67890123 | 45678901 |
| POSITION | 00000000 | 00111111 | 11112222 | 22222233 |

In this example, bits 2, 3, 5, 6, 8, 9, 14 and 15 are excluded from matching.

Returning to a discussion of FIG. 3, when the signature is found, the network testing software adds the signature location to the location cache, as shown in block 342. The network testing software may add the new signature location to the top of the signature cache, the bottom or the signature cache, or at a random location within the signature cache. The signature cache may be constructed with the newest location added to the top. The signature cache may be maintained with the most successful location (that is, the location at which the signature was found in the most packets) at the top, such that the newest location which was only successful once, is added to the bottom. The flow of actions continues at block 330 described above.

The method described above increases the efficiency of processing information in a large number of packets as the amount of time to and processing power needed to locate a signature when it is successfully found at a location specified in the location cache is substantially less that the amount of time and processing power needed to algorithmically search the entire packet for a signature. The number of incoming packets that can be processed in a given timer period is greatly increased using the above described method compared to algorithmically searching the entirety of each incoming packet for a signature.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least one network card, the network card including a processor, a memory and a network communications unit, the network testing system coupled with a network, the network testing system having instructions stored thereon which when executed cause the network testing system to perform operations comprising:
   creating a location cache in a portion of the memory, the location cache sized to store signature location information for at least four found signatures;
   receiving user selection to create a network test;
   receiving test information from the user, the test information including user specification of a signature and a varying location of the signature;
   receiving user selection to execute the network test;
   transmitting packets for the network test over the network;
   receiving a packet over the network;

searching the packet for the signature at locations specified in the location cache;
when the signature is found at a stored location specified in the location cache,
    obtaining pertinent data located after the signature, wherein the pertinent data includes at least a program group identifier (PGID) and a sequence number
    performing network testing processing involving the pertinent data;
when the signature is not found at any stored location specified in the location cache,
    searching the packet for the signature
    when the signature is found,
        adding a found location to the location cache
        obtaining the pertinent data located after the signature
        performing network testing processing involving the pertinent data.

2. The network testing system of claim 1 wherein searching the packet for the signature is performed using a Boyer-Moore fast string searching algorithm or a Quick Search Algorithm.

3. The network testing system of claim 1 wherein the found location and the stored location are each an offset from a beginning of a received packet that reflect a number of bits or bytes from the beginning of the received packet.

4. A computing device having at least one virtual machine executing network testing software, the computing device including a processor, a memory and a network communications unit, the computing device coupled with a network, the network testing software comprising instructions which when executed cause the computing device to perform operations comprising:
creating a location cache in a portion of the memory, the location cache sized to store signature location information for at least four found signatures;
receiving user selection to create a network test;
receiving test information from the user, the test information including user specification of a signature and a varying location of the signature;
receiving user selection to execute the network test;
transmitting packets for the network test over the network;
receiving a packet over the network;
searching the packet for the signature at locations specified in the location cache;
when the signature is found at a stored location specified in the location cache,
    obtaining pertinent data located after the signature, wherein the pertinent data includes at least a program group identifier (PGID) and a sequence number
    performing network testing processing involving the pertinent data;
when the signature is not found at any stored location specified in the location cache,
    searching the packet for the signature
    when the signature is found,
        adding a found location to the location cache
        obtaining the pertinent data located after the signature
        performing network testing processing involving the pertinent data.

5. The computing device of claim 4 wherein searching the packet for the signature is performed using a Boyer-Moore fast string searching algorithm or a Quick Search Algorithm.

6. The computing device of claim 4 wherein the found location and the stored location are each an offset from a beginning of a received packet that reflect a number of bits or bytes from the beginning of the received packet.

7. A non-transitory machine readable storage medium having instructions stored thereon which when executed by a processor cause a computing device to perform actions comprising:
receiving user selection to create a network test;
receiving test information from the user, the test information including user specification of a signature and a varying location of the signature;
receiving user selection to execute the network test;
transmitting packets for the network test over a network;
receiving a packet over the network;
searching the packet for the signature at locations specified in a location cache located in a volatile memory, the location cache sized to store at least four signature locations;
when the signature is found at a stored location specified in the location cache,
    obtaining pertinent data located after the signature, wherein the pertinent data includes at least a program group identifier (PGID) and a sequence number
    performing network testing processing involving the pertinent data;
when the signature is not found at any stored location specified in the location cache,
    searching the packet for the signature
    when the signature is found,
        adding a found location to the location cache
        obtaining the pertinent data located after the signature
        performing network testing processing involving the pertinent data.

8. The non-transitory machine readable storage medium of claim 7 wherein searching the packet for the signature is performed using a Boyer-Moore fast string searching algorithm or a Quick Search Algorithm.

9. The non-transitory machine readable storage medium of claim 7 wherein the found location and the stored location are each an offset from a beginning of a received packet that reflect a number of bits or bytes from the beginning of the received packet.

10. A network testing system having at least one network card, the network card including a processor, a memory and a network communications unit, the network testing system coupled with a network, the network testing system having instructions stored thereon which when executed cause the network testing system to perform operations comprising:
creating a location cache in a portion of the memory, the location cache sized to store signature location information for at least four found signatures;
receiving a packet over the network;
searching the packet for the signature at locations specified in the location cache;
when the signature is found at a stored location specified in the location cache,
    obtaining pertinent data located after the signature
    performing network testing processing;
when the signature is not found at any stored location specified in the location cache,
    searching the packet for the signature
    when the signature is found,
        adding a found location to the location cache
        obtaining pertinent data located after the signature, wherein the pertinent data includes at least a program group identifier (PGID) and a sequence number
        performing network testing processing involving the pertinent data.

11. The network testing system of claim 10 wherein searching the packet for the signature is performed using a Boyer-Moore fast string searching algorithm or a Quick Search Algorithm.

12. The network testing system of claim 10 wherein the found location and the stored location are each an offset from a beginning of a received packet that reflect a number of bits or bytes from the beginning of the received packet.

13. A computing device having at least one virtual machine executing network testing software, the computing device including a processor, a memory and a network communications unit, the computing device coupled with a network, the network testing software comprising instructions which when executed cause the computing device to perform operations comprising:
    creating a location cache in a portion of the memory, the location cache sized to store signature location information for at least four found signatures;
    receiving a packet over the network;
    searching the packet for the signature at locations specified in the location cache;
    when the signature is found at a stored location specified in the location cache,
        obtaining pertinent data located after the signature
        performing network testing processing;
    when the signature is not found at any stored location specified in the location cache,
        searching the packet for the signature
        when the signature is found,
            adding a found location to the location cache
            obtaining pertinent data located after the signature, wherein the pertinent data includes at least a program group identifier (PGID) and a sequence number
            performing network testing processing involving the pertinent data.

14. The computing device of claim 13 wherein searching the packet for the signature is performed using a Boyer-Moore fast string searching algorithm or a Quick Search Algorithm.

15. The computing device of claim 13 wherein the found location and the stored location are each an offset from a beginning of a received packet that reflect a number of bits or bytes from the beginning of the received packet.

16. A non-transitory machine readable storage medium having instructions stored thereon which when executed by a processor cause a computing device to perform actions comprising:
    receiving a packet over a network;
    searching the packet for a signature at locations specified in a location cache located in a volatile memory, the location cache sized to store at least four signature locations;
    when the signature is found at a stored location specified in the location cache,
        obtaining pertinent data located after the signature
        performing network testing processing;
    when the signature is not found at any stored location specified in the location cache,
        searching the packet for the signature
        when the signature is found,
            adding a found location to the location cache
            obtaining pertinent data located after the signature, wherein the pertinent data includes at least a program group identifier (PGID) and a sequence number
            performing network testing processing involving the pertinent data.

17. The non-transitory machine readable storage medium of claim 16 wherein searching the packet for the signature is performed using a Boyer-Moore fast string searching algorithm or a Quick Search Algorithm.

18. The non-transitory machine readable storage medium of claim 16 wherein the found location and the stored location are each an offset from a beginning of a received packet that reflect a number of bits or bytes from the beginning of the received packet.

\* \* \* \* \*